Patented Sept. 22, 1953

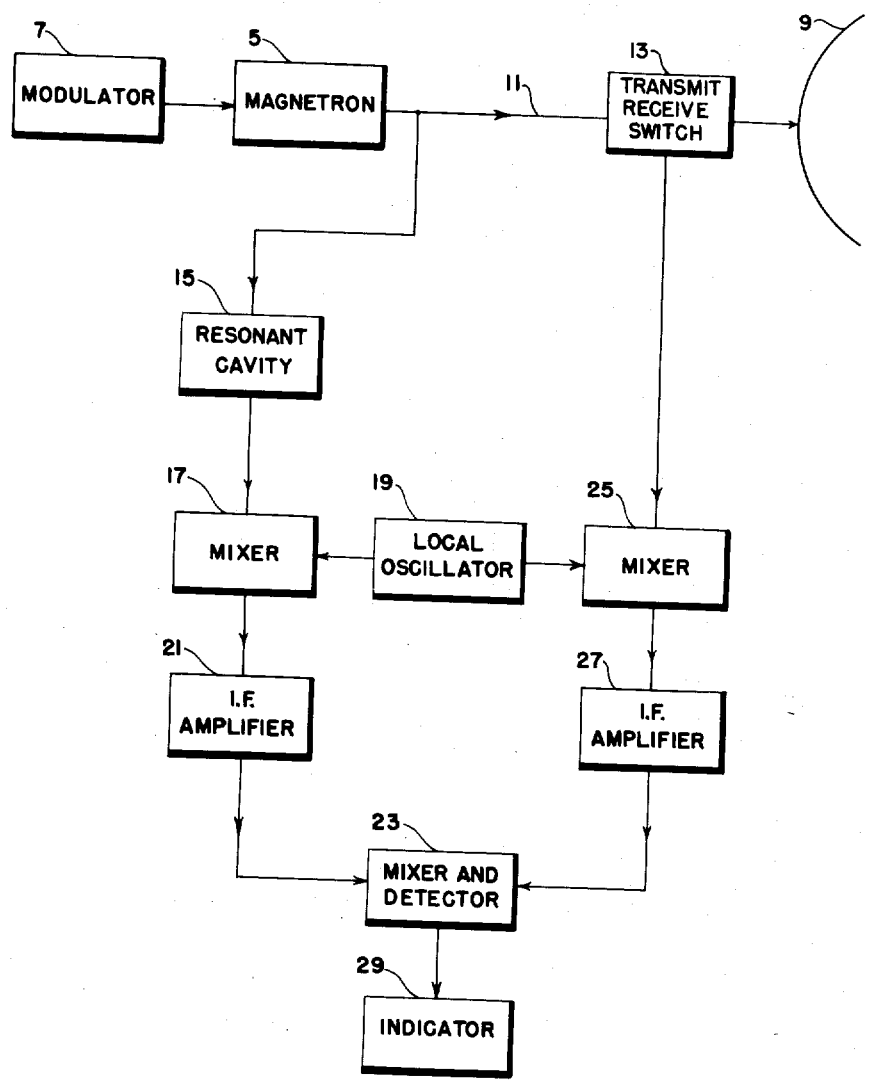

2,653,311

UNITED STATES PATENT OFFICE

2,653,311

RADAR SYSTEM FOR DISTINGUISHING MOVING TARGETS FROM STATIONARY TARGETS

Robert A. McConnell, Cambridge, Mass., assignor, by mesne assignments, to the United States of America as represented by the Secretary of War Application October 19, 1945, Serial No. 623,394

3 Claims. (Cl. 343—7.7)

The present invention relates to a radio object-locating system of the character adapted to distinguish fixed objects from moving objects, and it relates more particularly to such a system wherein a resonant cavity provides reference oscillations.

In general, systems which distinguish fixed objects from moving objects operate by transmitting high carrier frequency exploratory pulses of radiant energy in the usual manner. Corresponding echo pulses reflected from both fixed and moving objects are applied to a receiver channel associated with the transmitter. In addition however, these systems are characterized by the provision of reference oscillations, or a timing wave as they may also be called, which are initiated at the receiver and locked in synchronism (in coherence) with the exploratory pulses so that the timing wave is started in phase with the oscillations from the magnetron. The timing wave may consist of either continuous wave or interrupted continuous wave oscillations, but in either case it is essential that they have a fixed phase relation with respect to the phase of each transmitted exploratory pulse. As there is such a phase relationship between the reference oscillations and the exploratory pulses, it is evident that there is likewise a phase relationship between the reference oscillations and the received echo pulses. The relative rate of change of phase of the reference oscillations (timing wave) and the echo pulses returned from a particular object is a function of the relative velocity between the object and the radio object-locating system.

If the echo-pulses are algebraically combined with the reference oscillations, they will combine in such a manner as to reinforce or oppose one another to a varying degree in a relationship depending upon the relative phase between the two. By detecting the resulting combination, video pulses may be obtained, the amplitude of said video pulses being dependent upon said relative phase. As the object moves, the phase of successive echo-pulses relative to the reference oscillations changes, and the amplitude of resultant successive video pulses varies periodically. A system of this general character in which the received echo oscillations are compared with the timing wave locked in phase with the transmitted oscillations is known as a coherent pulse-echo system.

Heretofore the reference oscillations have been provided by a local oscillator associated with the receiver. As the phase of the oscillations must be synchronized to the exploratory pulses, some means for achieving coherence must be provided. Furthermore as such an oscillator must be frequency stable the local oscillator must be carefully constructed and mounted.

It is therefore an object of the present invention to provide a coherent pulse-echo system including a resonant cavity, wherein the reference oscillations are generated thereby, and synchronized with the exploratory pulses in a simple and reliable manner.

Another object of the present invention is to provide an improved coherent pulse-echo system, including a resonant cavity, wherein the reference oscillations and the echo pulses are combined at an intermediate frequency.

The above, and other objects and advantages will appear more fully from the following description together with the accompanying drawings, wherein the single figure shows a schematic diagram in block form of one specific embodiment of the invention.

In the present invention a resonant cavity is used in a particular manner. The resonant cavity is tuned to resonate at substantially the carrier-frequency of the transmitted exploratory pulses, and a portion of the transmitted energy contained in each exploratory pulse is introduced thereto. This energy shock excites the resonant cavity, thereby causing it to resonate at the carrier-frequency of the transmitted exploratory pulses. The oscillations produced thereby are then employed as a timing wave for the coherent pulse-echo system herein disclosed.

Referring now to the figure; magnetron 5 or any other suitable means for generating radio-frequency oscillations is pulsed by modulator 7, the output of magnetron 5 consisting of high-power, short duration pulses of radiant energy. These pulses are then fed to a suitable radiating means such as directional antenna 9, the transmission of the exploratory pulses from magnetron 5 to antenna 9 being accomplished by means of transmission line 11 and transmit-receive switch 13.

Transmit-receive switch 13 functions during the transmission exploratory pulses to connect magnetron 5 to antenna 9 and to disconnect the transmitter from a receiver channel presently to be described. During the period between pulses, and while echo pulses are being received, the switch functions to disconnect the transmitter from the antenna and to connect the antenna to the receiver channel.

A portion of the energy contained in each exploratory pulse is applied directly to a resonator such as resonant cavity 15, the oscillations set up therein by said exploratory pulse energy being in synchronism (in coherence) with the transmitted pulses. The oscillatory output from resonant cavity 15 may therefore be used as a timing wave.

The oscillations produced by resonant cavity 15 are fed to mixer 17, another input to mixer 17 comprising continuous wave oscillations from local oscillator 19. The beat frequency output of said mixer, consisting of the oscillations from resonant cavity 15 reduced from a frequency substantially equal to the carrier frequency of the exploratory pulses, to a suitable intermediate frequency may be fed to intermediate frequency amplifier 21. The amplified output therefrom consisting of reference oscillations are fed to mixer and detector 23.

Echo-pulses received at directional antenna 9, are fed through transmit-receive switch 13 to mixer 25, another input to mixer 25 being a second output from local oscillator 19. The beat frequency output of mixer 25 consists of echo-pulses having a carrier-frequency that has been reduced from a radio-frequency to an intermediate-frequency, the intermediate-frequency being substantially the same as that of the reference oscillations issuing from intermediate-frequency amplifier 19. The intermediate-frequency echo-pulses from mixer 25 are then fed to intermediate-frequency amplifier 27, the amplified pulse issuing therefrom being fed to mixer and detector 23.

The reference oscillations from intermediate frequency amplifier 21 and the echo pulses from intermediate frequency amplifier 27 are both applied to mixer and detector 23 where they combine on a manner heretofore described. The resultant oscillation voltage thus comprises echo-pulses superposed on the reference oscillations, the amplitude of the superposed pulses depending upon the relative phase of the reference oscillations and the phase of the echo pulses combined therewith. The envelope of the resulting combination may then be detected to provide video pulses.

In the case of a moving object, successive echo pulses reflected therefrom will have a varying phase relative to the reference oscillations, and hence the resulting video pulses will have a cyclical variation in amplitude. Video pulses representing fixed objects will, on the other hand, have a substantially constant amplitude.

The video pulses issuing from mixer and detector 23 may then be applied to indicator 29. This indicator may be of the visual type such as a cathode ray tube, and if desired it may be adapted to be responsive only to varying amplitude video pulses and thereby indicate only moving objects. It can be shown that the frequency of the amplitude variation of video pulses manifesting a particular moving object, is a function of the relative velocity between the object and the radio object-locating system. Thus if desired an aural type indicator responsive to the frequency variation of the amplitude of the pulses may be provided. By providing a frequency responsive visual or aural indicator it is possible to provide an indication of the relative velocity of an object having motion relative to the radio object locating system.

Having thus described the invention what is claimed as new and desired to be secured by Letters Patent is:

1. In a coherent pulse-echo radio object locating system of the character described, means for transmitting high carrier frequency exploratory pulses of radiant energy, a cavity resonator adapted to resonate at substantially said carrier frequency, means for energizing said cavity resonator by a portion of said exploratory pulses to produce reference oscillations, means for reducing the frequency of said reference oscillations to produce a second set of reference oscillations having an intermediate frequency, means for reducing the carrier frequency of received echo pulses to a carrier frequency substantially equal to said intermediate frequency, means for combining said last mentioned pulses with said second set of reference oscillations, means for detecting the combined pulses to obtain video pulses, and indicating means for translating at least a portion of said video pulses to develop information as to the characteristics of said object.

2. In a coherent pulse-echo radio object locating system of the character described, means for transmitting high carrier frequency exploratory pulses of radiant energy, an electrical resonator, means for energizing said resonator by a portion of said exploratory pulses to produce trains of reference oscillations each extending continuously substantially from one transmitted exploratory pulse to the next, means for receiving object-returned echo pulses, means for combining said reference oscillations and said echo pulses after reducing their frequencies to a frequency lower than the carrier frequency of said exploratory pulses, means for detecting the combination of said echo pulses and said reference oscillations to obtain video pulses, and indicating means for translating at least a portion of said video pulses into information of desired characteristics of said object.

3. A coherent pulse echo radio object locating system comprising means for intermittently transmitting short duration high carrier frequency pulses of radiant energy, means for receiving object returned echo pulses, cavity resonator means adapted to resonate at substantially said carrier frequency, means for shock exciting said cavity resonator means by at least a portion of said carrier frequency pulses to produce continuous trains of reference oscillations of said carrier frequency, each train extending substantially from one transmitted pulse to the next, and means for combining the received echo pulses with the reference oscillations from said cavity resonator means to produce video pulses.

ROBERT A. McCONNELL.

References Cited in the file of this patent

UNITED STATES PATENTS

| Number | Name | Date |
|---|---|---|
| Re. 21,955 | Chaffee | Nov. 25, 1941 |
| 2,253,589 | Southworth | Aug. 26, 1941 |
| 2,403,625 | Wolff | July 9, 1946 |
| 2,408,742 | Eaton | Oct. 8, 1946 |
| 2,415,095 | Varian et al. | Feb. 4, 1947 |
| 2,421,016 | Deloraine et al. | May 27, 1947 |
| 2,433,669 | Keister | Dec. 30, 1947 |
| 2,460,827 | Isely | Feb. 8, 1949 |
| 2,467,670 | Hershberger | Apr. 19, 1949 |
| 2,489,075 | Bishop | Nov. 22, 1949 |
| 2,512,144 | Emslie | June 20, 1950 |
| 2,535,274 | Dicke | Dec. 26, 1950 |
| 2,543,448 | Emslie | Feb. 27, 1951 |